(12) United States Patent
Sommerfeld et al.

(10) Patent No.: US 6,474,869 B1
(45) Date of Patent: Nov. 5, 2002

(54) BUSHING

(75) Inventors: Dean R. Sommerfeld, Iola, WI (US); Todd C. Kramer, Plover, WI (US)

(73) Assignee: Sunrise Medical HHG Inc., Longmont, CO (US)

( * ) Notice: Subject to any disclaimer, the term of this patent is extended or adjusted under 35 U.S.C. 154(b) by 50 days.

(21) Appl. No.: 09/661,656

(22) Filed: Sep. 14, 2000

Related U.S. Application Data

(60) Provisional application No. 60/153,889, filed on Sep. 14, 1999.

(51) Int. Cl.$^7$ ................................................ F16C 27/02
(52) U.S. Cl. ........................ 384/222; 384/221; 384/296; 384/300; 384/909
(58) Field of Search ................................ 384/215, 220, 384/221, 222, 223, 275, 276, 295, 296, 297, 299, 300, 420, 908, 909

(56) References Cited

U.S. PATENT DOCUMENTS

| | | | | |
|---|---|---|---|---|
| 3,009,746 A | * | 11/1961 | Haushalter | 384/222 |
| 3,039,831 A | * | 6/1962 | Thomas | 384/222 |
| 3,438,686 A | * | 4/1969 | Stone | 384/296 |
| 4,331,496 A | * | 5/1982 | Orndorff, Jr. | 384/276 |
| 4,509,870 A | * | 4/1985 | Taki | 384/296 |
| 4,707,149 A | * | 11/1987 | Hahle | 384/276 |
| 5,261,748 A | * | 11/1993 | Kameda | 267/141 |

* cited by examiner

*Primary Examiner*—Thomas R. Hannon
(74) *Attorney, Agent, or Firm*—MacMillan, Sobanski & Todd, LLC

(57) ABSTRACT

A bushing comprising a main body that is adapted to be supported by the first member. The main body is comprised of a rigid layer and one or more other layers supported by the rigid layer. One of the layers defines an axial bore that is adapted to receive a pin that movably couples the second member to the first member.

4 Claims, 4 Drawing Sheets

BUSHING

CROSS-REFERENCE TO RELATED APPLICATIONS

This application claims the benefit of U.S. Provisional Patent Application No. 60/153,889, filed on Sep. 14, 1999.

BACKGROUND OF THE INVENTION

This invention relates in general to bearings and more particularly, to a sleeve or liner-type plain rotary bearing. Most particularly, the invention relates to a multi-layer bushing.

A bushing is generally a fixed or removable cylindrical lining used to constrain or guide a shaft or reduce friction between moving parts. Bushings are generally formed of plastic or soft metal, such as nylon or brass, or graphite-filled sintered metal.

The low friction property of a bushing renders the bushing prone to slip or rotate. Moreover, the soft, pliable property limits a bushing's ability to be fit tightly within its working environment. Bushings made of graphite-filled sintered metal may have greater application in environments where a tight fit is desirable but such bushings are costly in comparison to plastic or soft metal bushings.

Plastic bushings may be a relatively low-cost alternative. However, plastic has a tendency to sink, shrink or otherwise change shape, especially when forming a relatively thick bushing. The resultant bushing is distorted to the extent that its inner and outer diameters are inconsistent. Even if a relatively thick plastic bushing were formed without distortion, the resultant bushing would encounter deformation when subjected to a load.

What is needed is a low-cost bushing which may be formed without distortion and which does not encounter deformation when subjected to a load.

SUMMARY OF THE INVENTION

The present invention is directed towards a low-cost bushing that is formed without distortion and which does not deform when subjected to a normal load. The bushing comprises a main body that is adapted to be supported by the first member. The main body is comprised of a rigid layer and one or more other layers supported by the rigid layer. One of the layers defines an axial bore that is adapted to receive a pin that movably couples the second member to the first member.

Various objects and advantages of this invention will become apparent to those skilled in the art from the following detailed description of the preferred embodiment, when read in light of the accompanying drawings.

DESCRIPTION

Figure 1:
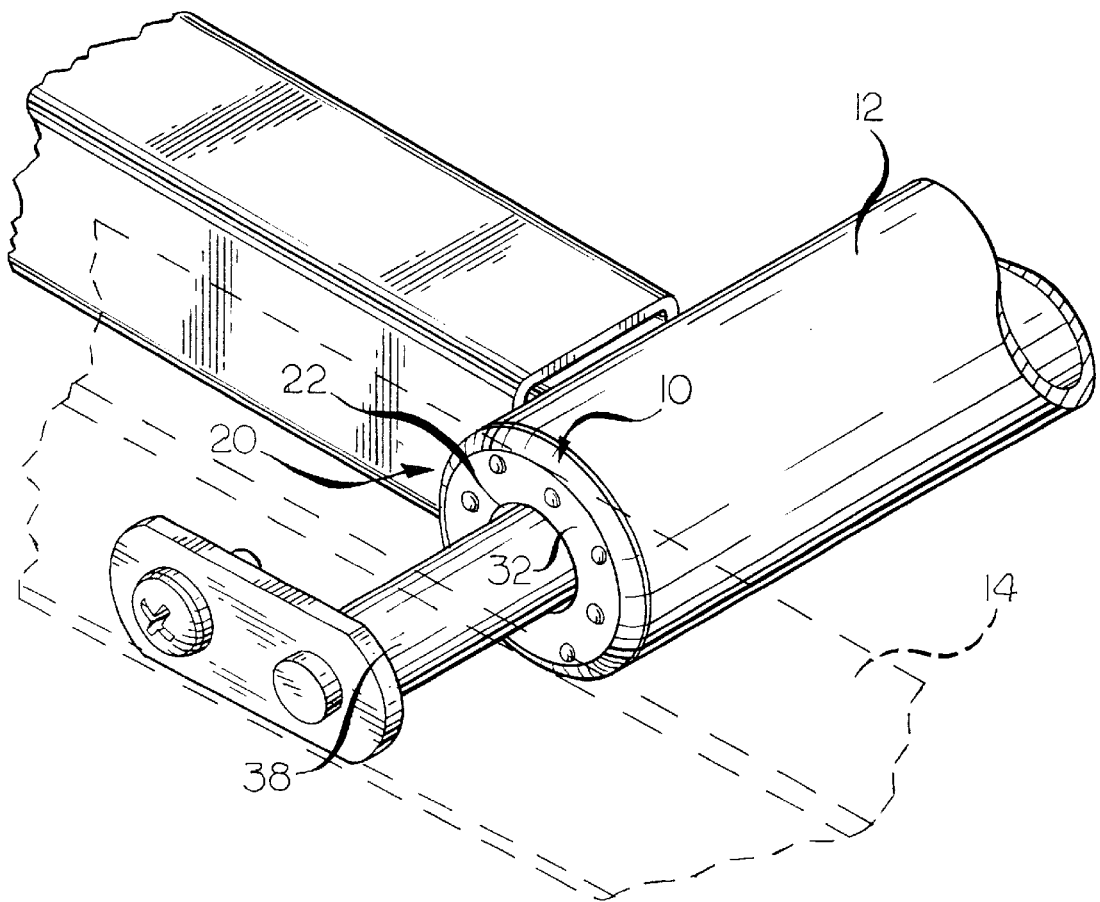
FIG. 1 is a perspective view of a bushing movably coupling two members to one another.
Figure 2:
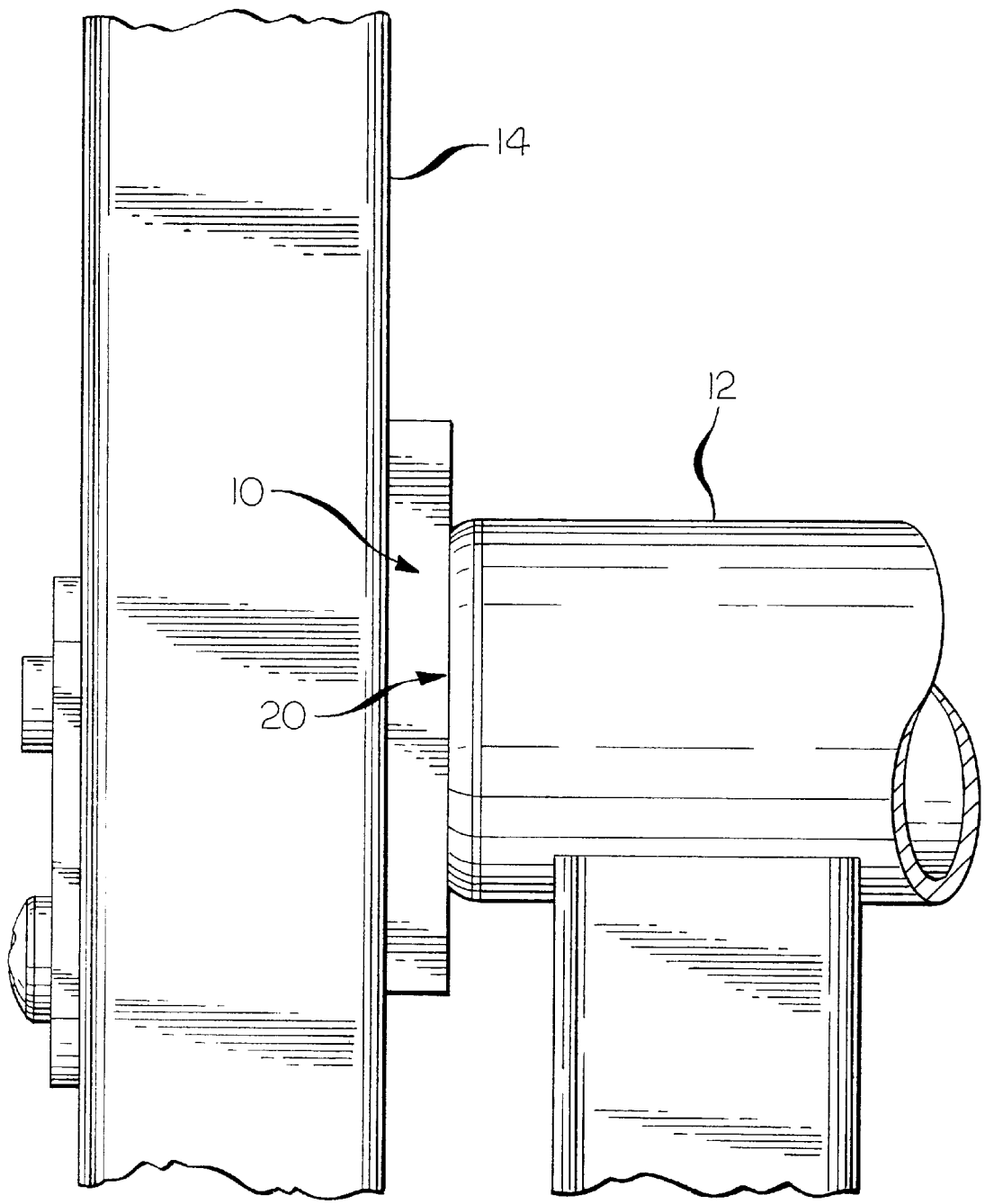
FIG. 2 is an enlarged side elevational view of the bushing and the two members shown in FIG. 1.
Figure 3:
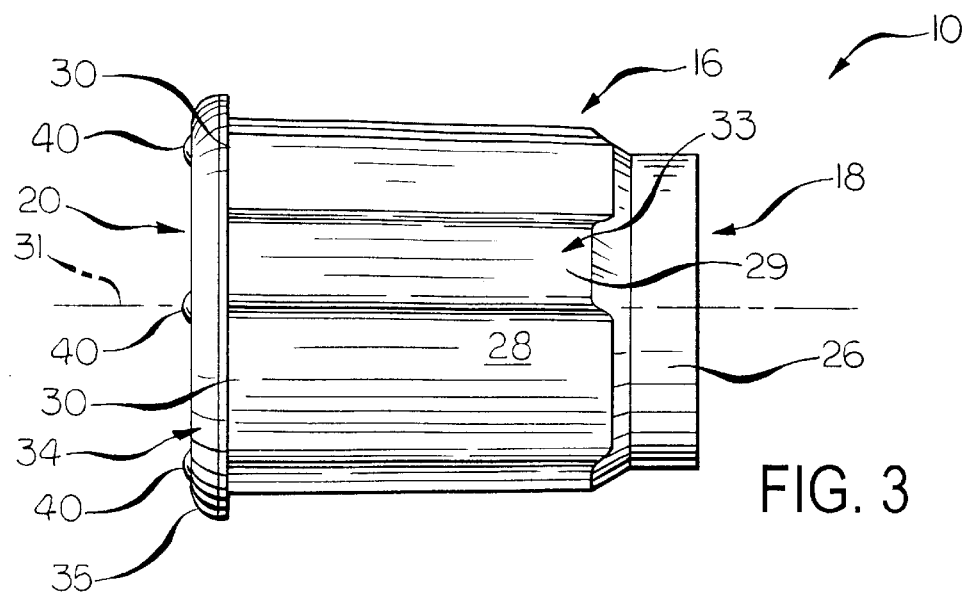
FIG. 3 is an elevational view of the bushing shown in FIGS. 1 and 2.

Referring now to the drawings, there is illustrated in FIGS. 1 through 3 a bushing 10 adapted for movably coupling members, such as the first and second members 12, 14 shown. The bushing 10 comprises a main body 16 (shown in FIGS. 3 through 5). The main body 16 shown is substantially cylindrical in shape. However, other shapes may be suitable for carrying out the invention. The main body 16 has opposing ends 18, 20. The opposing ends include a first or inner end 18 (shown in FIGS. 3 through 5) and a second or outer end 20. The main body 16 is further provided with an axial bore 22 (clearly shown in FIGS. 4 and 5).

Figure 4:
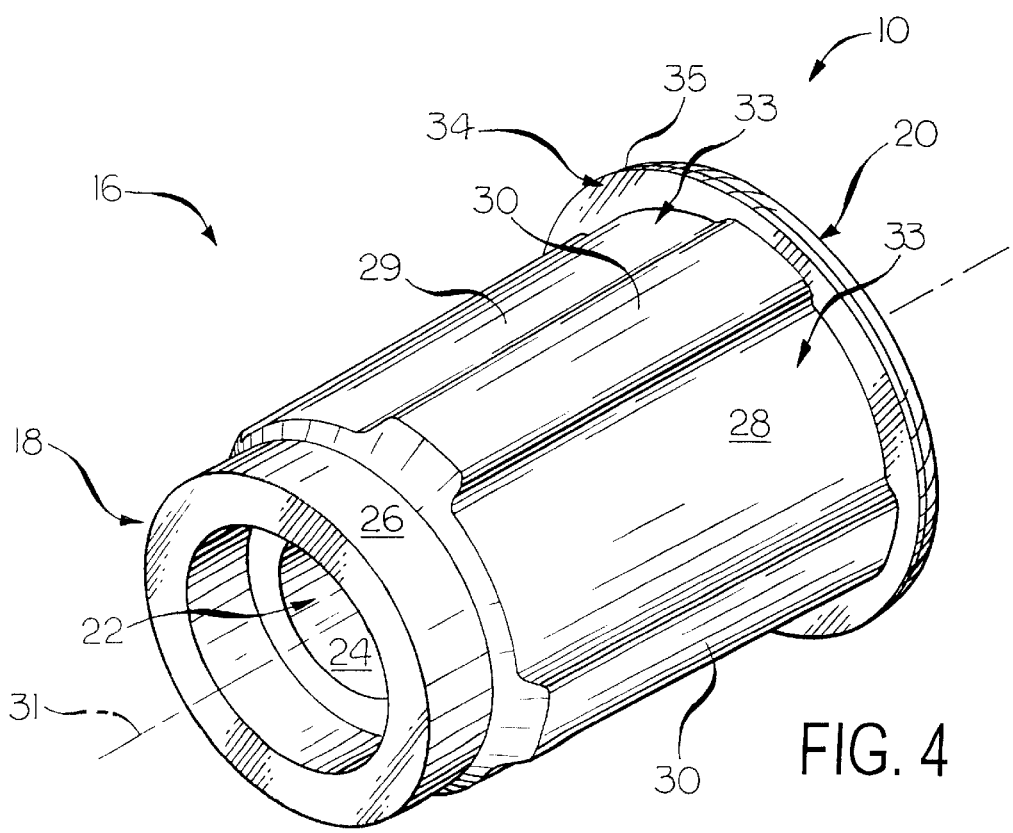
FIG. 4 is an enlarged perspective view of the bushing shown in FIGS. 1, 2, and 3.
Figure 5:
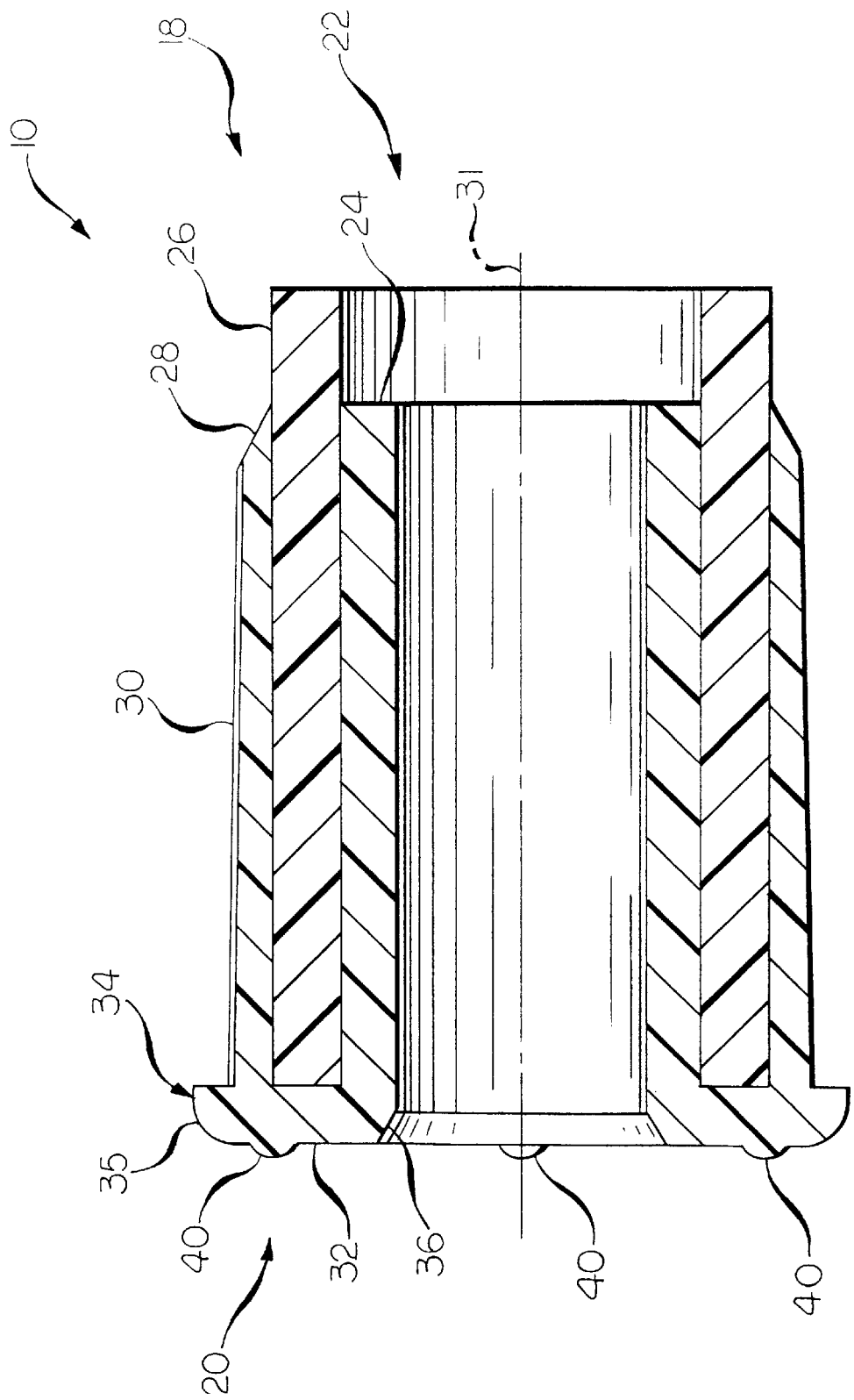
FIG. 5 is a sectional view of the bushing shown in FIGS. 1 through 4.

As shown in FIGS. 3 through 5, the main body 16 may be comprised of a plurality of layers or elements including a rigid layer and one or more other layers supported by the rigid layer. In the preferred embodiment of the invention, the main body 16 includes a low-friction inner layer 24, a pliable outer layer 28, and a rigid intermediate layer 26 located between the inner and outer layers 24, 28.

The inner layer 24 and outer layer 28 may be formed independently or integrally. The inner and outer layers 24, 28 are preferably annular layers formed of a pliable, low friction material, which permits the first and second members 12, 14 to move relatively easily with respect to one another. The inner and outer layers 24, 28 may be formed of brass, oil-impregnated bronze, oil-impregnate plastic, or plastic impregnated or coated with polytetraflouroethylene (PTFE). The inner and outer layers 24, 28 are most preferably formed of DELRIN 500 CL, a chemically lubricated plastic of du Pont de Nemours and Company, Delaware, U.S.A. DELRIN 500 CL is a pliable, low-friction plastic.

The rigid layer 26 is preferably an annular layer formed of a substantially rigid material that prevents the inner and outer layers 24, 28 from sinking, shrinking or otherwise changing as the bushing is being formed. The rigid layer 26 also prevents the inner and outer layers 24, 28 from deforming when the bushing 10 is under a normal load. Although any suitable material may be used for carrying out the invention, the rigid layer 26 is most preferably formed of a glass-filled plastic. A glass-filled plastic is a substantially non-compressible material that will retain its shape upon the application of compressive forces.

The inner and outer layers 24, 28 may be formed independently of the rigid layer 26. For example, the inner and outer layers 24, 28 may be formed with an annular cavity for receiving the rigid layer 26. Alternatively, the inner and outer layers 24, 28 may be formed around the rigid layer 26. Forming relatively thin inner and outer layers 24, 28 reduces the risk of sinks or voids forming in the main body 16.

In the preferred embodiment of the invention, the inner and outer layers 24, 28 are formed around the rigid layer 26 by holding a first or inner end of the rigid layer 26 and stabilizing a second or outer end of the rigid layer 26. Consequently, a portion of the inner layer 24 may extend inward from the second end 20 of the resultant bushing 10.

An outer surface 29 of the outer layer 28 is preferably provided with a plurality of circumferentially spaced protrusions 30. The protrusions 30 are preferably longitudinal in construction and extend radially from the outer surface 29 of the outer layer 28. The protrusions 30 may also extend substantially parallel relative to the central axis 31 of the main body 16. The central axis 31 is an axis that passes longitudinally through the center of the main body 16. The protrusions 30 are preferably radially compressible and axially expansible into depressions 33 defined between the protrusions 30.

Although a plurality of protrusions 30 is preferred, it should be understood that a single protrusion 30 may be suitable for carrying out the invention. Although longitudinal protrusions are shown, other protrusions, such as cylindrical bumps, may be suitable for carrying out the invention.

In use, the main body 16 is adapted to be inserted in an open end of a first member 12, such as the tubular member shown. The protrusions 30 extending from the outer layer 28 are subject to compression to produce a tight, press fit relationship between the main body 16 and the first member 12. This tight fit relationship prevents the main body 16 from rotating relative to the first member 12. This, in turn, reduces wear of the outer layer 28.

To aid in inserting the main body 16 into the first member 12, the first end 18 of the main body 16 may be provided with a chamfered surface that is engageable with an opening in the end of the first member 12. The chamfered surface functions as a guide that directs the main body 16 into the first member 12.

It should be understood that the protrusions 30 may sheer when the main body 16 is inserted into the first member 12. This may likewise produce a tight, press fit relationship between the main body 16 and the first member 12 and thus likewise eliminate slop between the main body 16 and the first member 12.

The second end 20 of the main body 16 is preferably covered with a layer 32 of material similar to that of the inner and outer layers 24, 28 set forth above. This layer 32 is preferably a low-friction material because the second end 20 functions as a thrust washer to resist axial movement of the coupled members 12, 14 relative to one another along the axis 31 of the main body 16.

The layer 32 extends radially outward to form an annular flange 34. The flange 34 is adapted to engage the end of the first member 12 upon inserting the main body 16 in the first member 12 to limit the travel of the bushing 10 relative to the first member 12. An outer annular surface 35 of the flange 34 may be chamfered to aid in joining the first and second members 12, 14 tightly together.

The layer 32 at the second end 20 of the main body 16 may further include one or more protrusions or nodules 40 extending longitudinally outward from the second end 20. The nodules 40 are engageable with the second member 14 upon coupling the first and second members 12, 14 together. The nodules 40 are preferably sufficiently resilient to compress or deform upon tightly engaging the first and second members 12, 14. The nodules 40 are provided to reduce the risk of axial displacement of the first member 12 relative to the second member 14.

To join the first and second members 12, 14 tightly together, one or more holes may be provided in the second member 14 that may align with the axial bore 22 passing through the main body 16. A pivot pin, such as the pin 38 shown in FIG. 1, is insertable into the aligned holes. The layer 32 at the second end 20 of the main body 16 may define an inner chamfered surface 36 that communicates with the axial bore 22. The chamfered surface 36 is provided to assist in guiding the pivot pin 38 smoothly into the axial bore 22.

The pin 38 is adapted to be received by the axial bore 22. The axial bore 22 is defined by the inner layer 24 of the main body 16. The pin 38 preferably fits tightly in the axial bore 22. This tight fit relationship reduces the risk of wear to the inner layer 24. Since the inner layer 24 is formed of a low-friction material, the pin 38 is free to rotate within the axial bore 22.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A bushing adapted for movably coupling a first member to a second member, said bushing comprising:

a main body that is adapted to be supported by the first member, said main body is comprised of an inner layer, and an outer layer, and a rigid layer located between said inner and outer layers, said inner layer defining an axial bore that is adapted to receive a pin that movably couples the second member to the first member, said outer layer being adapted to be inserted into the first member, wherein said inner and outer layers are formed of a pliable, chemically lubricated plastic.

2. A bushing adapted for movably coupling a first member to a second member, said bushing comprising:

a main body that is adapted to be supported by the first member, said main body is comprised of an inner layer, and an outer layer, and a rigid layer located between said inner and outer layers, said inner layer defining an axial bore that is adapted to receive a pin that movably couples the second member to the first member, said outer layer being adapted to be inserted into the first member, wherein an outer surface of said outer layer is provided with a protrusion that is dimensioned to produce a tight, press fit relationship between said main body and the first member.

3. The bushing according to claim 2, wherein said protrusion is compressible.

4. The bushing according to claim 3, wherein said protrusion is adapted to sheer upon inserting said main body into the first member.

* * * * *